2,919,198
Patented Dec. 29, 1959

2,919,198
PRODUCT AND PROCESS FOR THE PRODUCTION OF AQUEOUS GELS

Rüdolf Köhler, Dusseldorf, and Wolfgang Dierichs, Dusseldorf-Holthausen, Germany, assignors to Henkel & Cie. G.m.b.H., Dusseldorf-Holthausen, Germany, a corporation of Germany No Drawing. Application February 12, 1958
Serial No. 714,672

Claims priority, application Germany February 22, 1957

15 Claims. (Cl. 99—131)

This invention relates to a composition useful in the formation of aqueous gels containing partial amides of polyuronic acids and the corresponding process.

It is known that polyuronic acid esters may be reacted with liquid ammonia to form the corresponding polyuronic acid amides. In this manner it is possible to obtain polyuronic acid amides in which a portion or all of the carboxyl groups originally present in the polyuronic acid are transformed into amides. In addition to the carbonamide groups, if the transformation is incomplete, the polyuronic acid amides contain varying quantities of carboxyl groups neutralized with ammonia and a small number of carboxylic acid ester groups. The presence of these groups can be explained either by the fact that the esterification of the free polyuronic acids did not proceed to completion, and further that the amidation of the ester groups was likewise incomplete, or that during the amidation of the ester groups a saponification of the carboxylic acid ester group took place to a minor degree. Thus, by a choice of more or less completely esterified polyuronic acids or by a choice of suitable working conditions, it is possible to control the production of preparations in which a varying percentage of the carboxyl groups originally present have been transformed into amide groups. If a high percentage of the carboxyl groups originally present have been transformed into carbonamide groups—for example, 80 to 90% of them—the products so produced have the property of swelling in cold water without, however, dissolving therein. When the water is heated, however, they dissolve and upon cooling of the solution form thermo-reversible aqueous gels—that is, gels which can be liquefied by heating the same and subsequently transformed once again into gels by cooling as often as desired, provided the solution does not contain substances which saponify the carbonamide groups or which tend to degrade the carbohydrate structure of the polyuronic acid amides. With a decreasing number of carbonamide groups in the molecule and an increasing number of neutralized carboxyl groups in the molecule, the gel-forming properties of the polyuronic acid amides decrease; in other words, the products swell in cold water to an increasing degree and gels formed therewith become increasingly less solid, so that with a decreasing content of carboxylic acid amide groups it is possible to observe a smooth transition from a stiff gel to a highly viscous solution which no longer contains any gelling properties at all.

An object of our invention is to improve gel-forming properties of those partial amides of polyuronic acids which have a higher content of carboxyl groups and to enhance gel-forming properties of those partial amides of polyuronic acids which have a low content of carboxyl groups.

Another object of our invention is to provide a composition of dry ingredients which will be readily soluble in water and which will form heat-reversible gels after solution in water.

A further object of our invention is a composition which is readily soluble in cold water and which upon solution sets into a heat-reversible aqueous gel.

We have found that amides of polyuronic acids which contain a large number of carbonamide groups (—$CONR_1R_2$) and a lesser number of neutralized carboxyl groups (—COOMe) can be transformed into aqueous gels especially readily if they are dissolved in water in the presence of a substance which upon solution slowly forms an acid in water.

Partial carboxylic acid amides which are primarily useful for the composition and the process of our invention are the amides of alginic acid, pectic acid or cellulose glycolic acid. The production of the partial alginic acid amides is described in our copending United States application Ser. No. 496,920, filed March 25, 1955, now Patent #2,881,161. These amides should contain from 0.5 to 1.5, preferably from 0.6 to 1.0, acyl groups per uronic acid unit. About 50% to about 80% of the acyl groups should be present in the form of carbonamide groups, whereas the remaining acyl groups should be present substantially in the form of neutralized carboxyl groups. The cation of these neutralized carboxyl groups is preferably the ammonium ion, but products which contain the cations of mono-basic organic or inorganic bases may also be worked up with equal success.

Suitable non-acidic-reacting substances which form acids gradually in the presence of water are lactones of hydroxy acids and those acid anhydrides which likewise form acids gradually in the presence of water. Within the series of lactones, primarily the lactones of sugar acids, such as gluconic acid lactone or mannuronic acid lactone, are preferable. An example of a useful acid anhydride is glycolic acid anhydride.

To carry out the process according to our invention, the acid-forming substances and the partial polyuronic acid amides are dissolved in water simultaneously or in any desired sequence. However, care should be taken that the acid amides are dissolved before significant quantities of acid have been formed. It is therefore advantageous to introduce the partial polyuronic acid amides into the water prior to or together with the acid-forming substances. In general, a highly viscous to pasty solution of the alginic acid amide is first formed, which is then transformed into a gel by the action of the acid which is formed in the course of a certain period of time. The concentrations to be used in this process are generally less than 30 parts by weight of gel-forming partial polyuronic acid amides per 100 parts by weight of water. It is preferred to work with concentrations between 1 and 5% by weight of partial polyuronic acid amide.

From the group of non-acidic-reacting substances which form acids gradually in the presence of water the most interesting from a technical viewpoint are those which are readily soluble in water both in the form of the free acid produced and in the non-acidic reacting form. For the purpose of the present invention, however, it is sufficient if the free acids produced are soluble in water to the extent that they impart a pH-value within the range of 2 to 6 to the gel subsequent to the gel formation. The quantity of non-acidic-reacting substance to be used should be chosen so that the number of acid groups present after the reaction with water is complete is at least equal to the number of neutralized carboxyl groups present in the partial polyuronic acid amides. However, since an excess of non-acidic-reacting substance is not injurious, the latter can also be used in substantially greater quantities. In this case the pH-value which develops subsequent to gel formation and which lies within the above-mentioned range is also a good measure of the quantity of non-acidic-reacting substance required. In general, it is advantageous to work with 5 to 100 parts by weight of non-acidic-reacting substances per 100 parts by weight of partial polyuronic acid amides.

We have found that firmer gels are obtained when small quantities of ions of polyvalent metals are present. These ions should preferably be colorless ions, such as the ions of calcium, magnesium or aluminum. The quantity of salts of these ions may be very small and may amount to less than 1% by weight based on the partial polyuronic acid amides. Consequently, the small quantities of hardness-forming minerals in ordinary tap water are sufficient to produce the desired effect.

Our invention makes it possible to obtain aqueous gels in the cold within relatively short periods of time. Our invention, however, is not limited to gel formation in the cold as the solution of the gel-forming substances can be accelerated by dissolving at elevated temperatures, for example at temperatures up to 100° C. Gel formation is more rapid after cooling the solution to the gelatinizing temperature, if the gel-forming substances are dissolved in hot water rather than when dissolved in cold water. Moreover, working at elevated temperatures has the further advantage that especially homogeneous gels are obtained. It is often sufficient to obtain the effects of solution at higher temperatures by using dissolving temperatures of 30° to 50° C.

The substances to be reacted with each other—that is, the partial polyuronic acid amides and the non-acidic-reacting substances—may be admixed with each other and may, if desired, be compounded with additional materials which are to be worked into the gels, and such compositions may be stored and sold in commerce.

With the aid of the process according to the present invention, therefore, it is possible to produce gels which are useful for a variety of scientific, technical and commercial purposes or in the household. Such gels may, for example, be used in the production of nutrient media for microörganisms, for pharmaceutical and cosmetic preparations and for other purposes. If the non-acidic-reacting substances are physiologically harmless materials, the composition of our invention may be employed to produce foods of the gelatin or pudding type, which—in contrast to those heretofore produced from starch, gelatin, agar-agar, etc.—do not have to be warmed for preparation. For this purpose the partial polyuronic acid amides may, in addition to the non-acidic-reacting substances necessary for the formation of the gel, also contain all of the other ingredients, so that ready-to-use dry mixtures which yield appetizing and coherent gelatin-like foods upon stirring the same with a small amount of liquid, such as fruit juices, wine, water or milk can be produced. These foods may be consumed in that form or may be further worked up. As an example of further treatment, the production of ice cream or similar frozen foods may be mentioned. In this case it is sufficient if the partial polyuronic acid amide is used in such low concentrations that the gels formed thereby are very soft and no longer sufficiently solid to be cut up. Under these circumstances it is possible to work with partial polyuronic acid amide concentrations of 0.1 to 5%, preferably 0.2 to 2%, by weight.

The compositions and the process of making the thermo-reversible aqueous gels in accordance with this invention are specifically illustrated by the following, non-limiting examples:

*Example I*

20 parts by weight of an alginic acid amide, produced in accordance with the process described in our copending application Ser. No. 496,920, in which about 70% of all of the carboxyl groups originally present in the alginic acid had been transformed into carbonamide groups and the remainder of the carboxyl groups were present in the form of ammonium salts, were finely milled and intimately admixed in a dry state with 2 parts by weight of gluconic acid lactone. This mixture was stirred into 1000 parts by weight of distilled water at a temperature of about 20° C. A clear solution was formed which in the course of about 1 hour solidified into a clear coherent gel. This gel liquefied on heating and again solidified on cooling.

If, instead of the distilled water, tap water of about 20° C. hardness is used, a somewhat more solid gel is obtained.

*Example II*

6.5 parts by weight of dry milk powder, 3.7 parts by weight of cocoa, 0.7 part by weight of gluconic acid lactone, 1 part by weight of the alginic acid mentioned in Examples I and 5 parts by weight of cane sugar were intimately mixed. This mixture was stirred into 50 parts by weight of water at 55° C. A thin solution was first formed, which upon standing and cooling solidified into a coherent solid gel. This gel was a gelatin-like chocolate pudding having an excellent taste.

*Example III*

0.5 part by weight of gluconic acid lactone, 1 part by weight of the alginic acid amide described in Example I, 0.8 part by weight of vanillin and 5 parts by weight of sugar were mixed and stirred into 50 parts by weight of cold milk. The mixture was heated to about 70° C. The warm mixture was then allowed to stand and cool, whereupon it formed a vanilla pudding having a good taste.

*Example IV*

20 parts by weight of the alginic acid amide described in Example I were milled and contained no particles having a grain size above 0.09 mm. This fine powder was admixed with 1.5 parts by weight of finely powdered α-dilactone of d-manno-saccharic acid. This mixture was stirred slowly into 1000 parts by weight of water at 50° C. while continuously stirring, whereupon it rapidly dissolved. The solution was maintained at 50° C. for another 20 to 30 minutes and then allowed to cool. A solid, clear, thermo-reversible gel was obtained.

*Example V*

10 parts by weight of the alginic acid amide described in Example I were mixed in a dry state with 1.2 parts by weight of glycolic acid anhydride. This mixture was stirred into 400 parts by weight of water, and the solution was maintained at 60° C. for about 20 minutes with occasional stirring. Thereafter, the solution was allowed to cool, whereupon it formed a coherent thermo-reversible gel.

*Example VI*

13 parts by weight of the amide of pectic acid, in which about 75% of the carboxyl groups originally present has been transformed into amide groups while the remaining carboxyl groups were present in the form of ammonium salt groups, were admixed with 1.3 parts by weight of gluconic acid lactone and the mixture was finely milled. The resulting powder was slowly stirred into 500 parts by weight water at 30° C. while continuously stirring. A clear solution was obtained which became more and more solid as it continued to stand, and after about 1 hour it solidified into a thermo-reversible gel.

From the foregoing, it will be readily apparent to those skilled in the art that the compositions of this invention can be varied widely without losing the property of obtaining thermo-reversible gels, that is, gels which liquify upon heating and solidify again upon cooling.

While we have given specific examples of our new compositions and certain examples of the process of producing aqueous gels by our method, it will be understood that these examples are for purpose of illustration and that various modifications and changes can be made in the examples given without departing from the spirit of our invention or the scope of the following claims, and that while various theories have been given for the purpose of explaining the reactions, we do not intend to be bound by these theories.

We claim:

1. As a composition of matter, a dry mixture capable of forming an aqueous gel when admixed with water, said gel being thermo-reversible, comprising as gel-forming ingredients a water-soluble polyuronic acid amide wherein about 50% to about 80% of the acyl groups are present as carbonamide groups and the remainder of the acyl groups are present essentially as neutralized carboxy groups admixed with a sufficient amount of a water-soluble, non-acidic-reacting organic compound which forms free acids gradually in the presence of water to impart a pH within the range of 2 to 6 to the gel so-formed.

2. As a composition of matter, a dry mixture capable of forming an aqueous gel when admixed with water, said gel being thermo-reversible, comprising as gel-forming ingredients 100 parts of an alginic acid amide wherein about 50% to about 80% of the acyl groups are present as carbonamide groups and the remainder of the acyl groups are present essentially as neutralized carbonxyl groups and 5 to 100 parts of a water-soluble, non-acidic-reacting organic compound which forms free acids gradually in the presence of water.

3. As a composition of matter, a dry mixture capable of forming an aqueous gel when admixed with water, said gel being thermo-reversible, comprising as gel-forming ingredients 100 parts of a pectic acid amide wherein about 50% to about 80% of the acyl groups are present as carbonamide groups and the remainder of the acyl groups are present essentially as neutralized carboxyl groups and 5 to 100 parts of a water-soluble, non-acidic-reacting organic compound which forms free acids gradually in the presence of water.

4. As a composition of matter, a dry mixture capable of forming an aqueous gel when admixed with water, said gel being thermo-reversible, comprising as gel-forming ingredients 100 parts of an alginic acid amide wherein about 70% of the acyl groups are present as carbonamide groups and the remainder of the acyl groups are present essentially as ammonia-neutralized carboxyl groups and 5 to 100 parts of gluconic acid lactone.

5. As a composition of matter, a dry mixture capable of forming an aqueous gel when admixed with water, said gel being thermo-reversible, comprising as gel-forming ingredients 100 parts of an alginic acid amide wherein about 70% of the acyl groups are present as carbonamide groups and the remainder of the acyl groups are present essentially as ammonia-neutralized carboxyl groups and 5 to 100 parts of α-dilactone of d-mannosaccharic acid.

6. As a composition of matter, a dry mixture capable of forming an aqueous gel when admixed with water, said gel being thermo-reversible, comprising as gel-forming ingredients 100 parts of an alginic acid amide wherein about 70% of the acyl groups are present as carbonamide groups and the remainder of the acyl groups are present essentially as ammonia-neutralized carboxyl groups and 5 to 100 parts of glycolic acid anhydride.

7. As a composition of matter, a dry mixture capable of forming an aqueous gel when admixed with water, said gel being thermo-reversible, comprising as gel-forming ingredients 100 parts of pectic acid amide wherein about 75% of the acyl groups are present as carbonamide groups and the remainder of the acyl groups are present essentially as ammonia-neutralized carboxyl groups and 5 to 100 parts of gluconic acid lactone.

8. A process for the production of thermo-reversible, aqueous gels comprising dissolving in an excess amount of water as gel-forming ingredients a polyuronic acid amide wherein about 50% to about 80% of the acyl groups are present as carbonamide groups and the remainder of the acyl groups are present essentially as neutralized carboxyl groups and a sufficient amount of a water-soluble, non-acidic-reacting organic compound which forms free acids gradually in the presence of water to impart a pH within the range of 2 to 6 to the gel so-formed and allowing the solution to gel.

9. The process of claim 8 wherein up to about 30 parts of the said polyuronic acid amide are used per 100 parts by weight of water.

10. A process for the production of thermo-reversible, aqueous gels comprising dissolving in an excess amount of water at temperatures of from about 20° C. to about 100° C. as gel-forming ingredients 100 parts of an alginic acid amide wherein about 50% to about 80% of the acyl groups are present as carbonamide groups and the remainder of the acyl groups are present essentially as neutralized carboxyl groups and 5 to 100 parts of a water-soluble, non-acidic-reacting organic compound which forms free acids gradually in the presence of water and allowing the solution to gel.

11. The process of claim 10 wherein said water-soluble, non-acidic-reacting organic compound which forms free acids gradually in the presence of water is a lactone.

12. The process of claim 10 wherein said water-soluble, non-acidic-reacting organic compound which forms free acids gradually in the presence of water is an acid anhydride.

13. A process for the production of thermo-reversible, aqueous gels comprising dissolving in an excess amount of water at temperatures of from about 20° C. to about 100° C. as gel-forming ingredients 100 parts of an pectic acid amide wherein about 50% to about 80% of the acyl groups are present as carbonamide groups and the remainder of the acyl groups are present essentially as neutralized carboxyl groups and 5 to 100 parts of a water-soluble, non-acidic-reacting organic compound which forms free acids gradually in the presence of water and allowing the solution to gel.

14. In the process of making edible puddings and gelatins which require dissolving gel-forming ingredients in aqueous liquids the improvement which comprises utilizing as gel-forming ingredients a polyuronic acid amide wherein about 50% to about 80% of the acyl groups are present as carbonamide groups and the remainder of the acyl groups are present essentially as neutralized carboxyl groups and a sufficient amount of a water-soluble, non-acidic-reacting organic compound which forms free acids gradually in the presence of water to impart a pH within the range of 2 to 6 to the gel so-formed.

15. A thermo-reversible aqueous gel comprising water and as gel-forming ingredients a polyuronic acid amide wherein about 50% to about 80% of the acyl groups are present as carbonamide groups and the remainder of the acyl groups are present essentially as neutralized carboxyl groups and a sufficient amount of a water-soluble, non-acidic-reacting organic compound which forms free acids gradually in the presence of water to impart a pH within the range of 2 to 6 to the gel so-formed.

References Cited in the file of this patent

UNITED STATES PATENTS

| | | |
|---|---|---|
| 2,380,739 | Evans et al. | July 31, 1945 |
| 2,494,912 | Steiner et al. | Jan. 17, 1950 |

OTHER REFERENCES

"The Pectic Substances," by Kertesz, Interscience Publishers, Inc., New York, 1951, pp. 122 and 259.

UNITED STATES PATENT OFFICE

CERTIFICATE OF CORRECTION

Patent No. 2,919,198                          December 29, 1959

Rudolf Köhler et al.

It is hereby certified that error appears in the printed specification of the above numbered patent requiring correction and that the said Letters Patent should read as corrected below.

Column 4, line 14, for "Examples" read -- Example --; column 6, line 47, for "50% ta" read -- 50% to --.

Signed and sealed this 23rd day of August 1960.

(SEAL)
Attest:

KARL H. AXLINE
Attesting Officer

ROBERT C. WATSON
Commissioner of Patents